US010574740B2

(12) United States Patent
Dong et al.

(10) Patent No.: US 10,574,740 B2
(45) Date of Patent: Feb. 25, 2020

(54) METHOD AND APPARATUS FOR SCALING IN A VIRTUALIZED NETWORK

(71) Applicant: Telefonaktiebolaget LM Ericsson (publ), Stockholm (SE)

(72) Inventors: Huoming Dong, Shanghai (CN); Mattias Ambjörn, Älvsjö (SE); Liangliang Guo, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 220 days.

(21) Appl. No.: 15/743,536

(22) PCT Filed: Aug. 6, 2015

(86) PCT No.: PCT/CN2015/086256
§ 371 (c)(1),
(2) Date: Jan. 10, 2018

(87) PCT Pub. No.: WO2017/020298
PCT Pub. Date: Feb. 9, 2017

(65) Prior Publication Data
US 2018/0205786 A1 Jul. 19, 2018

(51) Int. Cl.
*G06F 9/455* (2018.01)
*H04L 29/08* (2006.01)
(Continued)

(52) U.S. Cl.
CPC ...... *H04L 67/1002* (2013.01); *G06F 9/45533* (2013.01); *G06F 9/5077* (2013.01);
(Continued)

(58) Field of Classification Search
CPC ............... G06F 9/45533; G06F 9/5077; H04L 67/1002; H04L 67/10
See application file for complete search history.

(56) References Cited

U.S. PATENT DOCUMENTS

| 2015/0082308 A1 | 3/2015 | Kiess et al. |
| 2017/0005935 A1 | 1/2017 | Tao et al. |

FOREIGN PATENT DOCUMENTS

| CN | 104468688 A | 3/2015 |
| CN | 104811396 A | 7/2015 |

(Continued)

OTHER PUBLICATIONS

European Telecommunications Standards Institute, "Network Functions Virtualisation (NFV); Virtual Network Functions Architecture", ETSI GS NFV-SWA 001 V1.1.1, Dec. 2014, pp. 1-93.

*Primary Examiner* — Wissam Rashid
(74) *Attorney, Agent, or Firm* — Coates & Bennett, PLLC

(57) ABSTRACT

Embodiments of the present disclosure provide a method for scaling of a server VNF Manager VNF in a virtualized network. The virtualized network comprises at least a server VNF, a client VNF connected to the server VNF and a VNF manager. The connection between the client VNF and the server VNF is initiated by the client VNF. The method is performed at a PCM server. Firstly, scaling information is obtained at the PCM server in response to a scaling operation performed by the VNF manager on the server VNF. Once the scaling information is obtained, then the PCM server notifies the client VNF of the scaling information. There is also provided a method performed at a client VNF and corresponding apparatuses.

16 Claims, 13 Drawing Sheets

(51) Int. Cl.
*G06F 9/50* (2006.01)
*H04L 29/06* (2006.01)

(52) U.S. Cl.
CPC .......... *H04L 67/10* (2013.01); *H04L 67/1034* (2013.01); *H04L 67/42* (2013.01)

(56) References Cited

FOREIGN PATENT DOCUMENTS

WO          2015107466 A1     7/2015
WO     WO-2016188562 A1 * 12/2016   .......... H04L 41/065

* cited by examiner

METHOD AND APPARATUS FOR SCALING IN A VIRTUALIZED NETWORK

TECHNICAL FIELD

The non-limiting and exemplary embodiments of the present disclosure generally relate to virtualized networks, and specifically to a method and an apparatus for scaling of a virtualized network function in a virtualized network.

BACKGROUND

This section introduces aspects that may facilitate better understanding of the present disclosure. Accordingly, the statements of this section are to be read in this light and are not to be understood as admissions about what is in the prior art or what is not in the prior art.

Current networks are comprised of diverse network functions (NFs). These NFs are connected, or chained, in a certain way in order to achieve the desired overall functionality or service that the network is designed to provide. Generally, these NFs communicate with surrounding peers to process and transport control signaling and/or user plane data through standardized communication/network protocols. Most current network services are defined by statically combining network functions in a way that can be expressed using an NF Forwarding Graph or NF Set construct. A major change brought by network functions virtualization (NFV) is that virtualization enables additional dynamic methods rather than just static ones to construct and manage the network function graphs or sets combining these network functions.

In order to fulfil different business needs and capacity requirements, the scalability of a NF/Virtualized Network Function (VNF) becomes an important and key feature for service providers. In Cloud and NFV, scaling in/out is considered as a basic feature and is seen as an enabler for quickly modifying the capacity of products/services on demand so as to meet increasingly business needs, wherein the term "scaling out" refers to adding resources and the term "scaling in" refers to removing resources, e.g. Virtual Machines (VMs) or instances of a VNF.

At scaling of a VFN, ideally, its peer VNF should not be impacted by or aware of the VNF being scaled out or scaled in. For example, IP connections or application level connections use Virtual Internet Protocol (VIP) per VNF to keep service interfaces unchanged. All running/sealing instances of the VNF behind a VIP address share the load of all services to be provided.

However, during today's transition era, especially in telecom domains with lots of traditional equipment being deployed onsite, technology like VIP may not be applicable for scaling of a VNF in a virtualized network, since an instance or instances inside the VNF still have its or their own service interfaces for service connections. When instances are added/removed in a VNF, the service interfaces associated with these instances are also added/removed, and then manual configurations on the peer VNF are needed for adapting the connections via these service interfaces. For example, when a VNF is scaled out, e.g. a new instance is added into the VNF, a connection to the added instance may be initiated manually by configuring an IP connection address the peer VNF shall use. This may involve massive manual operations when a large number of instances will be added or removed, resulting in a high operational and executive cost.

Therefore, there is a need for a more efficient solution applicable for scaling of a VNF in virtualized networks.

SUMMARY

Various embodiments of the present disclosure mainly aim at providing an efficient and flexible solution applicable for scaling of a VNF in virtualized networks. Other features and advantages of embodiments of the present disclosure will also be understood from the following description of specific embodiments when read in conjunction with the accompanying drawings, which illustrate the principles of embodiments of the present disclosure.

In a first aspect of the present disclosure, there is provided a method for scaling of a server VNF in the virtualized network. The virtualized network comprises at least a server VNF, a client VNF connected to the server VNF and a VNF manager. The connection between the client VNF and the server VNF is initiated by the client VNF. The method is performed at a management server, which is referred to as a Peer Connection Manager, PCM, server. Firstly, scaling information is obtained at the PCM server in response to a scaling operation performed by the VNF manager on the server VNF. Once the scaling information is obtained, then the PCM server notifies the client VNF of the scaling information.

In an embodiment, the server VNF may comprise at least one instance of a server VNF component, VNFC. The client VNF may also comprise at least one instance of a client VNFC. In this embodiment, the at least one instance of the server VNFC may be connected by the at least one instance of the client VNFC. More particularly, each of the at least one instance of the client VNFC may be connected to the at least one instance of the server VNFC.

In various embodiments, the PCM server may be implemented at one or more instances of the server VNFC in the server VNF or may be implemented at a VNF separate from the server VNF and the client VNF. In the latter case, the PCM server may be implemented at the VNF manager.

In an embodiment, the scaling information may be obtained directly from the VNF manager.

In another embodiment where the server VNF comprises at least one PCM client that may obtain the scaling information, the scaling information may alternatively be obtained at the PCM server from the at least one PCM client.

In a further embodiment that the client VNF comprises at least one PCM client, the PCM server may notify all of the at least one PCM client of the scaling information.

In yet another embodiment, the scaling operation performed by the VNF manager may comprise either adding an instance of the server VNFC to the server VNF or removing an instance of the server VNFC from the server VNF. In this embodiment, the scaling information may comprise at least interface change information and information on a type of the scaling operation. When the type of the scaling operation is adding an instance of the server VNFC, the interface change information at least comprises information regarding an interface between the added instance of the server VNFC and the at least one instance of the client VNFC in the client VNF. When the type of the scaling operation is removing an instance of the server VNFC, the interface change information at least comprises information regarding an interface between the removed instance of the server VNFC and the at least one instance of the client VNFC in the client VNF.

In another embodiment where the PCM server is implemented at the VNF manager or at a VNF separate from the server VNF and the client VNF, the scaling operation may comprise either adding a server VNF or removing the server VNF. In this embodiment, the scaling information may comprise at least interface change information and information on a type of the scaling information. When the type of the scaling operation is adding a server VNF, then the interface change information at least comprises information on an interface between the added server VNF and the client VNF. When the type of the scaling operation is removing a server VNF, then the interface change information at least comprises information on an interface between the removed server VNF and the client VNF.

In yet another embodiment, communications between the at least one PCM client and the PCM server may be conducted according to a dedicated protocol different from a protocol used for communications between the server VNF and the client VNF.

In yet another embodiment, the virtualized network may further comprise at least one standby PCM server that is capable of taking over the function of the PCM server when the PCM server is not available.

In yet another embodiment, the scaling information may be notified by sending a request to the client VNF. Then in response that the request is sent to the client VNF, a response may be received from the client VNF for at least acknowledging the receipt of the request. The response may also comprise a status of an adaptive operation corresponding to the scaling operation, e.g. the adaptive operation being in progress. Furthermore, another response for reporting the status of the adaptive operation corresponding to the scaling operation, e.g. the adaptive operation being completed, may also be received from the client VNF.

The method according to the first aspect of the present disclosure provides an automatic and flexible solution to scaling of a server VNF in a virtualized network. According to this method, no manual operations are needed to notify scaling information and configure a client VNF in response to a scaling operation performed on the server VNF, thereby the operational and executive cost may be reduced and failures caused by undesired manual operations may be reduced.

In a second aspect of the present disclosure, there is provided a method for scaling of a server VNF in a virtualized network. The virtualized network comprises at least the server VNF, a client VNF connected to the server VNF and a VNF manager. The connection between the client VNF and the server VNF is initiated by the client VNF. The method is performed at the client VNF. According to this method, firstly, scaling information is received from a PCM server in response to a scaling operation performed by the VNF manager on the server VNF. Then the client VNF performs an adaptive operation based on the scaling information.

In an embodiment, the server VNF may comprise at least one instance of a server VNFC. The client VNF may comprise at least one instance of a client VNFC. The at least one instance of the server VNFC in the server VNF are connected by the at least one instance of the client VNFC.

In another embodiment that the scaling information is received from the PCM server in a request, the method may further comprise acquiring capability information of the server VNF and the client VNF. Also, the client VNF may acknowledge the receipt of the request in a response to the request and/or reports a status of an adaptive operation corresponding to the scaling operation in a response to the request.

Preferably, communications of the capability information, the scaling information and the response between the client VNF and the PCM server may be conducted according to a dedicated protocol different from a protocol used for communications between the server VNF and the client VNF.

In an embodiment that the scaling operation is a scaling out operation, e.g. adding an instance of the server VNFC to the server VNF, the operation of performing the adaptive operation may comprise initiating a connection to the added instance of the server VNFC.

In another embodiment that the scaling operation is a scaling in operation, e.g. removing an instance of the server VNFC from the server VNF, the operation of performing the adaptive operation may comprise disconnecting the connection from the removed instance of the server VNFC.

In yet another embodiment that the scaling operation is the scaling out operation, e.g. adding a server VNF, the operation of performing the adaptive operation may comprise initiating a connection to the added server VNF.

In yet another embodiment that the scaling operation is the scaling in operation, e.g. removing a server VNF, the operation of performing the adaptive operation may comprise disconnecting the connection from the removed server VNF.

According to the method in the second aspect, the client VNF can be configured based on scaling information which is automatically notified by the PCM server, thereby the operational and executive cost may be reduced and failures caused by undesired manual operations may be reduced since no manual operations are involved.

In a third aspect of the present disclosure, there is provided an apparatus for scaling of a server VNF in a virtualized network. The virtualized network comprises at least the server VNF, a client VNF connected to the server VNF and a VNF manager. The connection between the client VNF and the server VNF is initiated by the client VNF. The apparatus may be embodied in the server VNF or at a VNF separate from the server VNF and the client VNF, wherein the separate VNF may be the VNF manager.

Particularly, the apparatus comprises an obtaining unit and a notifying unit. The obtaining unit is configured to obtain, at a PCM server, scaling information in response to a scaling operation performed by the VNF manager on the server VNF. The notifying unit is configured to notify the client VNF of the scaling information.

In an embodiment, the apparatus may further comprise an acquiring unit and a receiving unit. The acquiring unit may be configured to acquire capability information of the server VNF and the client VNF. In this embodiment, the notifying unit may be configured to notify the scaling information by sending a request to the client VNF. The receiving unit may be configured to receive a response from the client VNF for at least acknowledging the receipt of the request and/or to receive another response for reporting a status of an adaptive operation corresponding to the scaling operation.

In a fourth aspect of the present disclosure, there is provided an apparatus for scaling of a server VNF in a virtualized network. The virtualized network comprises at least the server VNF, a client VNF connected to the server VNF and a VNF manager. The connection between the server VNF and the client VNF is initiated by the client VNF.

Particularly, the apparatus comprises a receiving unit and an operating unit. The receiving unit is configured to receive, at the client VNF, scaling information from a PCM server in response to a scaling operation performed by the VNF manager on the server VNF. The operating unit is configured to perform, at the client VNF, an adaptive operation based on the scaling information.

In another embodiment, the apparatus may further comprise an acquiring unit and a responding unit. The acquiring unit may be configured to acquire capability information of the server VNF and the client VNF. In this embodiment, the receiving unit may further be configured to receive the scaling information in a request from the PCM server. The responding unit may be configured to acknowledge the receipt of the request in response to the request and/or to report a status of an adaptive operation corresponding to the scaling operation in response to the request.

In a fifth aspect of the present disclosure, there is provided an apparatus for scaling of a server VNF in a virtualized network. The virtualized network comprises at least the server VNF, a client VNF connected to the server VNF and a VNF manager. The apparatus comprises a processor and a memory. The memory containing instructions executable by the processor, whereby the apparatus is operative to perform the method according to the first aspect or to perform the method according to the second aspect of the present disclosure.

In a sixth aspect of the present disclosure, there is provided an apparatus for scaling of a server VNF in a virtualized network. The virtualized network comprises at least the server VNF, a client VNF connected to the server VNF and a VNF manager. The apparatus comprises processing means adapted to perform the method according to the first aspect or to perform the method according to the second aspect of the present disclosure.

In a seventh aspect of the present disclosure, there is provided a computer program product comprising instructions which, when executed on at least one processor, cause the at least one processor to carry out the method according to the first aspect or to perform the method according to the second aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which.

Like reference numbers and designations in the various drawings indicate like elements.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "a further embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

For better and easier understanding of the present disclosure, some general concepts will be introduced first, which however will not constitute a limitation to the present disclosure.

Figure 1:
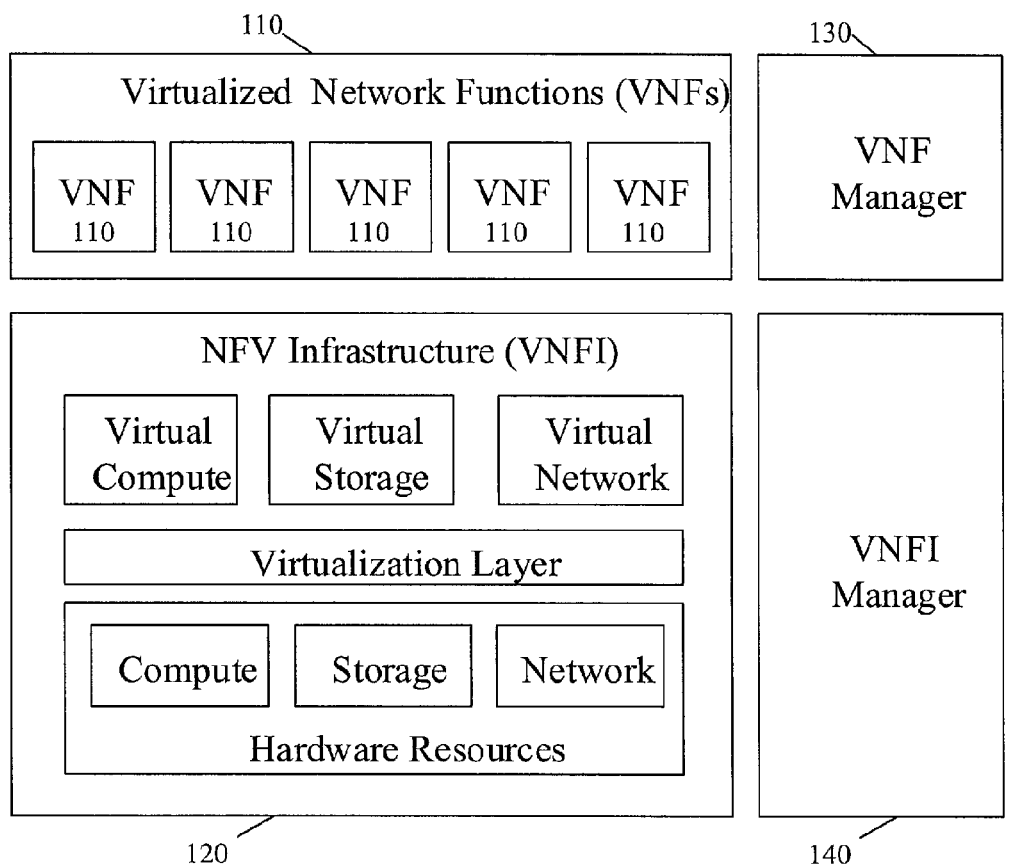
FIG. 1 illustrates a high-level NFV framework defined according to ETSI GS NFV 002 V1.2.1.

Network Functions Virtualization envisages the implementation of NFs as software-only entities that run over the NFV Infrastructure (NFVI). FIG. 1 illustrates a high-level NFV framework defined according to ETSI GS NFV 002 V1.2.1, according to which, three main working domains are identified in NFV:

Virtualized Network Function 110, as the software implementation of a network function which is capable of running over the NFVI.

Particularly, a VNF is a virtualization of a NF in a legacy non-virtualized network. Examples of NFs are 3GPP™ Evolved Packet Core (EPC) network elements, e.g. Mobility Management Entity (MME), Serving Gateway (SGW), Packet Data Network Gateway (PGW); elements in a home network, e.g. Residential Gateway (RGW); and conventional network functions, e.g. Dynamic Host Configuration Protocol (DHCP) servers, firewalls, etc. ETSI GS NFV 001 provides a list of use cases and examples of target NFs for virtualization.

A VNF can be composed of multiple internal components, which may be referred to as VNFC. Each component can be instantiated as multiple instances, which may be referred to as VNFC instances.

NFVI 120, including the diversity of physical resources and how these can be virtualized.

Particularly, NFVI supports the execution of VNFs. The NFVI is the totality of all hardware and software components which build up the environment in which VNFs are deployed, managed and executed. The NFVI can span across several locations, i.e. places where NFVI-PoPs are operated. The network providing connectivity between these locations is regarded to be part of the NFVI. From the VNF's perspective, the virtualization layer and the hardware resources look like a single entity providing the VNF with desired virtualized resources.

NFV Management and Orchestration, including a NFV manager 130 and a NFVI manager 140, which covers the orchestration and lifecycle management of physical and/or software resources that support the infrastructure virtualization, and the lifecycle management of VNFs. NFV Management and Orchestration focuses on all virtualization-specific management tasks necessary in the NFV framework.

The NFV manager 131 at least provides management and orchestration related to scaling of VNFs.

As mentioned above in the Technical Background, in the prior art, when a VNF is scaled out by a VNF manager e.g. by adding a new VNFC instance, the operator needs to manually configure the added new VNFC instance's information, e.g. including an IP address, on all instances in its peer VNF, and thereby the instances in the peer VNF can initiate new connections to the newly added VNFC instance. This manual operation may cost lots of operation and executive efforts and may also lead to a failure.

For the scaling in case, the operator also needs to manually change the configurations of all instances of the peer VNF, to let them know which VNFC instance(s) will be removed and thus have a chance to do some clean-up work before the VNFC instance(s) are removed. And then the disconnection between the instances of the peer VNF and the removed VNFC instance(s) will not be treated as a failure. Likewise, this will also cost lots of operation and executive efforts and may also lead to a failure.

Hereafter, a VNF who initiates a connection to another VNF will be called a "client VNF" and the other VNF who is connected by the client VNF is called a "server VNF". Correspondingly, a VNF component of the client VNF will be called a "client VNFC" and a VNF component of the server VNF will be called a "server VNFC".

Particularly, a Session Border Controller (SBC) and a Media Gateway (MGw) may be regarded as typical examples for the server VNF and client VNF. The SBC and MGw are key border nodes in IP Multimedia Subsystem (IMS) networks, which are located at network borders together to provide an ability of correlating signaling and media streams (such as audio and video streams) that pass the network borders, hence providing a comprehensive suite of functions required to access and interconnect IMS Core domains and external IP networks with preserved security, privacy, and quality of service (QoS). Here the SBC may be a P-CSCF (Proxy-Call Session Control Function), an IMS-ALG (Application Level Gateway) on a user network interface (UNI), or an IBCF (Interconnection Border Control Functions) on a network-network interface (NNI). MGw may be a C-BGF (Core Border Gateway Function) on the UNI interface and an I-BGF (Internet Border Gateway Function) on the NNI interface.

The SBC and MGw communicate using H.248 protocol (1a interface). When the MGw is booted, all instances of the MGw will actively initiate connections to the instances of the SBC which are manually configured beforehand.

In today's Cloud/NFV environments, a large number of VNFs or VNFC instances are deployed to meet increasingly capacity and big data processing requirements, and thus scaling is expected to be used as a daily procedure, e.g. for data centre defragmentation/rationalization. Therefore, the prior art will result in an even higher operational and executive cost for operators.

In order to overcome at least part of the above disadvantages, various embodiments of the present disclosure described with reference to FIGS. 2-14 provide a solution.

Although the following description will be based on the NFVI structure, a person skilled in the art shall understand that the concept and principle of the present disclosure may be more generally applicable to any other network structures where automatic peer connection management is needed at scaling.

Figure 2:
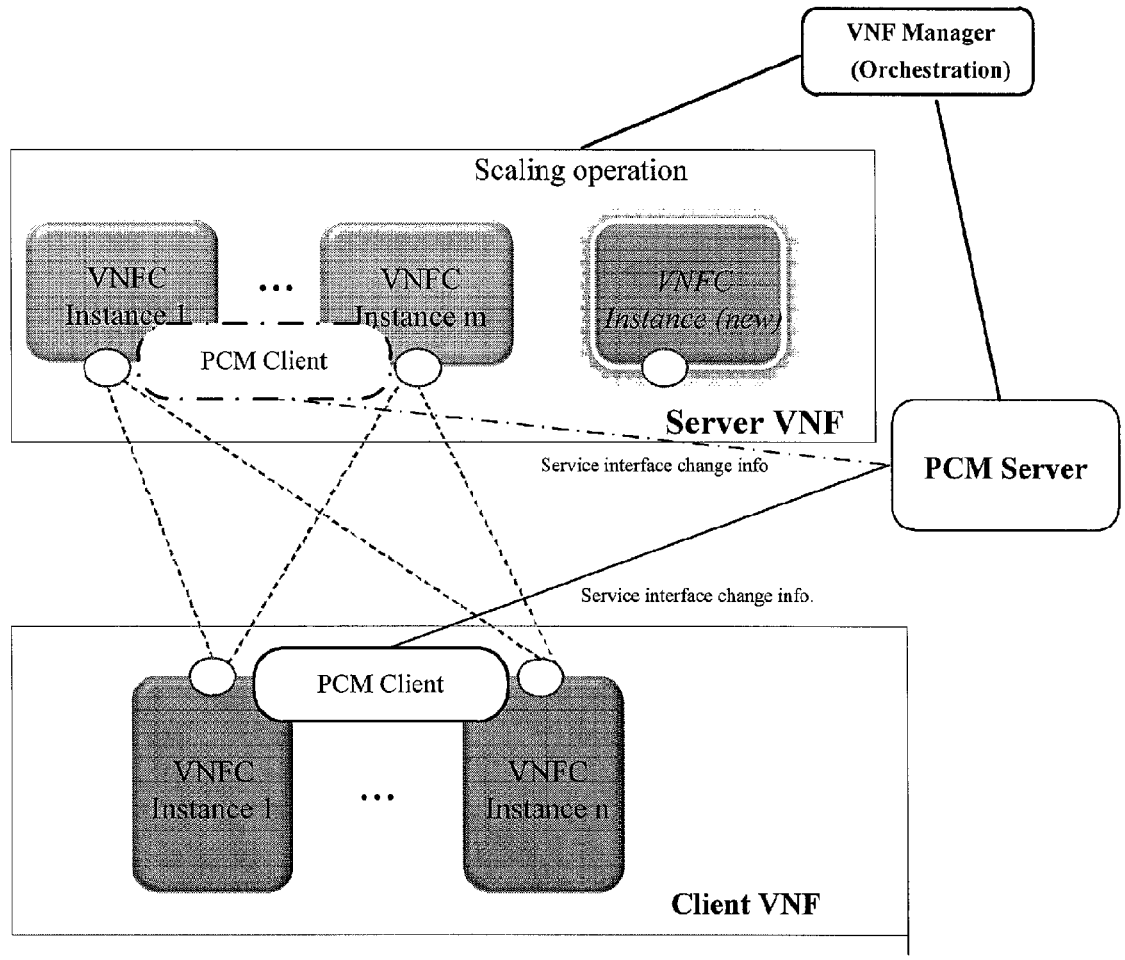
FIG. 2 illustrates a general structure of a virtualized network in which a method according to various embodiment of the present disclosure can be implemented.

For easier description of the present disclosure, a general structure of a virtualized network in which a method according to various embodiment of the present disclosure can be implemented is schematically illustrated in FIG. 2. As illustrated, the virtualized network comprises a server VNF, such as a SBC, a client VNF, such as an MGw, a VNF manager for management and orchestration of scaling, and a Peer Connection Manager (PCM) server.

The PCM server is a piece of server function hosting up to date service interface information, including scaling information, which is advertised to the concerned VNFs.

Depending on implementations, the service interface information may be received from PCM clients (which will be described below) in a server VNF suffering from scaling, or may be received from the VNF manager who performs a scaling operation on the server VNF. Although the PCM sever is implemented as a standalone server separated from the server VNF and the VNF manager in FIG. 2, the PCM server may also be implemented together with PCM clients inside the server VNF, or even at the VNF Manager or as a part thereof.

The PCM client is a client function responsible for obtaining the scaling information, including but not limited to service interface change information and/or notifying the same to the associated PCM server, depending on whether the PCM client is located in the server VNF or in the client VNF. The PCM client may also perform adaptive operations inside the VNF where it is located during the scaling. One or more PCM clients may be implemented as a standalone instance connected to a VNF or as one or more modules/functions resided on VNFC instances of the VNF.

According to various embodiments of the present disclosure, both the PCM server and PCM clients may reside within the server VNF, while for the client VNF, only PCM clients may reside in it.

Further, in the virtualized network according to an embodiment of the present disclosure, there may be more than one PCM server, in which at least one PCM server is active. The at least one active PCM server is responsible for notifying the client VNF of scaling information. There may also be at least one standby PCM server that is capable of taking over the function of an active PCM server when the active PCM server is not available.

In addition, communications between the PCM server and the PCM clients may be conducted in accordance to the existing transport protocol or according to a new protocol dedicated for communicating scaling information according to embodiments of the present disclosure.

Figure 3:
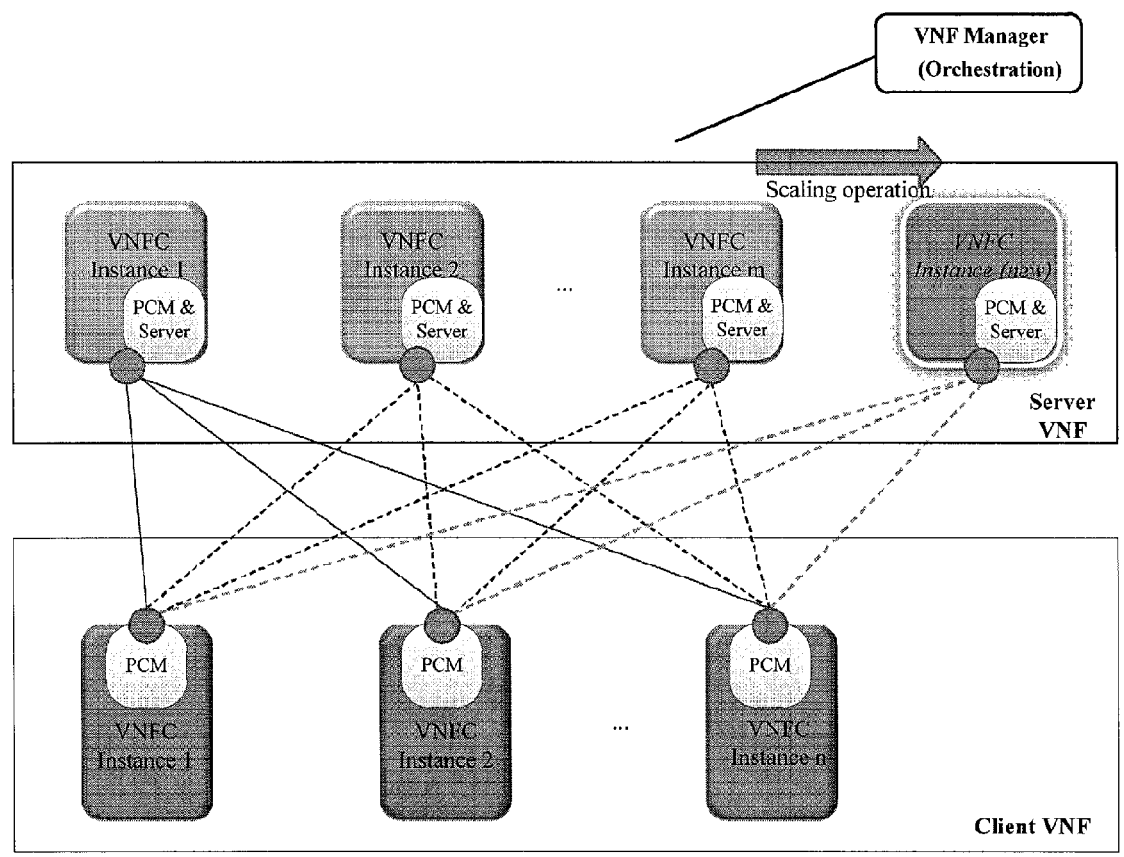
FIG. 3 illustrates an application scenario when scaling out is performed in a specific structure of a virtualized network according to an embodiment of the present disclosure.

FIG. 3 illustrates an application scenario when scaling out is performed in a specific structure of a virtualized network according to an embodiment of the present disclosure in which one or more PCM servers are implemented together with one or more PCM clients on m VNFC instances in a server VNF, and one or more PCM clients are implemented on n VNFC instances in a client VNF. It shall be appreciated that the number of PCM servers and PCM clients in the server VNF may be less than the number m of the VNFC instances in the server VNF, while the number of PCM clients in the client VNF may be less than the number n of the VNFC instances in the client VNF.

In this embodiment, communications between the PCM servers in the server VNF and the PCM clients in the client VNF is conducted by re-using the existing service interface according to the existing protocol that is used for the service communications between the server VNF and the client VNF, which may be indicated with a same solid circle at each VNFC instance in this figure.

When the server VNF is a SBC VNF and the client VNF is an MGw VNF, the communications between the PCM servers in the SBC VNF and the PCM clients in the MGw VNF may be conducted via the existing H.248 links according to the H.248 protocol.

A main operation procedure for the scaling out scenario is described as below.

Upon a request or trigger for scaling out the server VNF, the VNF manager performs a scaling operation on the server VNF, for example adding one or more VNFC instances to the server VNF. In the embodiment of FIG. 3, one VNFC instance shown with 'new' is added.

Then the PCM clients in the server VNF may obtain scaling information of the newly added one or more VNFC instances directly from the VNF manager or obtain the scaling information from the server VNF based on the scaling operation performed by the VNF manager. Additionally, the PCM clients may perform adaptive operations according to the scaling out operation performed by the VNF manager, for example adapting connections between the server VNFC instances and the client VNFC instances according to the interface change resulting from the added one or more VNFC instances. In this case, the scaling information may comprise at least information on an interface between the added server VNFC instance(s) and the client VNF and a type of the scaling operation, i.e. the scaling out operation.

Afterwards, the PCM clients in the server VNF may notify at least one active PCM server among the PCM servers of the scaling information. In the embodiment of FIG. 3, only one active PCM server on VNFC instance 1 is active. Those PCM servers other than the at least one active PCM server may serve as standby PCM servers for taking over the function of any active PCM server when that PCM server is not available, e.g. due to a failure or removal.

Subsequently, the at least one active PCM server notifies all connected client VNFC instances of the scaling information via the existing links for service communications between the server VNF and the client VNF according to the existing protocol.

At the client VNF side, after receiving the scaling information from the at least one active PCM Server, all the connected VNFC instances in the client VNF will perform adaptive operations, for example initiating a connection to the newly added VNFC instance(s) in the server VNF. After this, the newly added VNFC instance(s) can be in operation.

With this specific structure, for a scenario when scaling in is performed by the VNF manager, i.e. removing one or more server VNFC instances, main differences from the illustrated scaling out scenario lie in that: the scaling information conveyed between the at least one active PCM server and the PCM clients in the client VNF may comprise at least information on an interface(s) between the removed one or more server VNFC instances and the client VNF and a type of the scaling operation, i.e. the scaling in operation; and when receiving this information by the client VNF, particularly by all the connected VNFC instances in the client VNF, the client VNF may perform adaptive operations, for example disconnecting the connection(s) from the removed one or more VNFC instances before they are actually removed.

Figure 4:
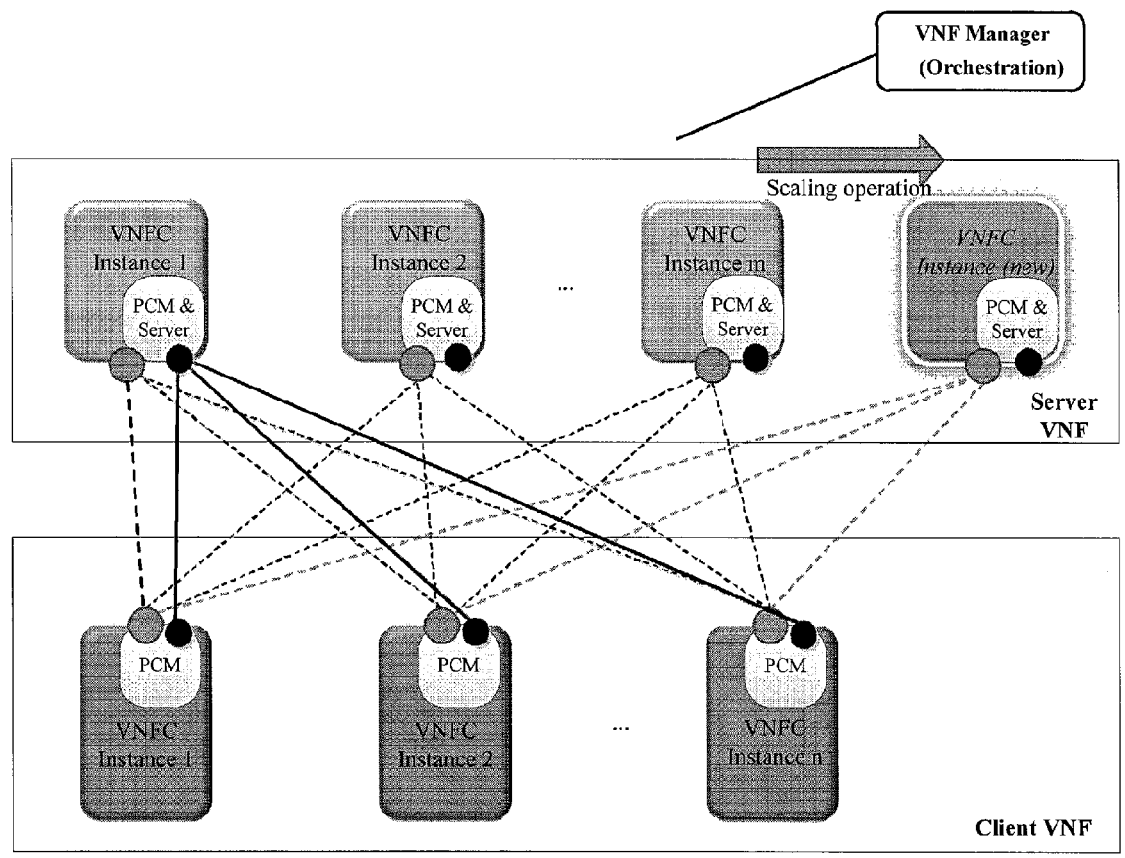
FIG. 4 illustrates an application scenario when scaling out is performed in another specific structure of a virtualized network according to an embodiment of the present disclosure.

FIG. 4 illustrates an application scenario when scaling out is performed in another specific structure of a virtualized network according to an embodiment of the present disclosure, in which one or more PCM servers are implemented together with one or more PCM clients on m VNFC instances in a server VNF and one or more PCM clients are implemented on n VNFC instances in a client VNF. It shall be appreciated that the number of PCM servers and PCM clients in the server VNF may be less than the number m of the VNFC instances in the server VNF, while the number of PCM clients in the client VNF may be less than the number n of the VNFC instances in the client VNF.

The only difference between the specific structures in FIG. 3 and FIG. 4 lies in that communications between the at least one active PCM server in the server VNF and the PCM clients in the client VNF is conducted by using a dedicated protocol different from the existing protocol used for service communications between the server VNF and the client VNF, which may be indicated with two different sizes of solid circles at each VNFC instance in this figure. The small solid circles and those lines connected between them indicate the communications between the at least one active PCM server and the PCM clients in the client VNF. This dedicated protocol may decouple the communications for scaling of the server VNF in the virtualized network from the existing communications between the server VNF and the client VNF, thereby minimizing an impact of the scaling on the existing communications or services between the VNFs.

Other operations or features in the application scenario of FIG. 4 are the same as those described with reference to FIG. 3 and thus will not be repeated herein for the sake of brevity.

Figure 5:
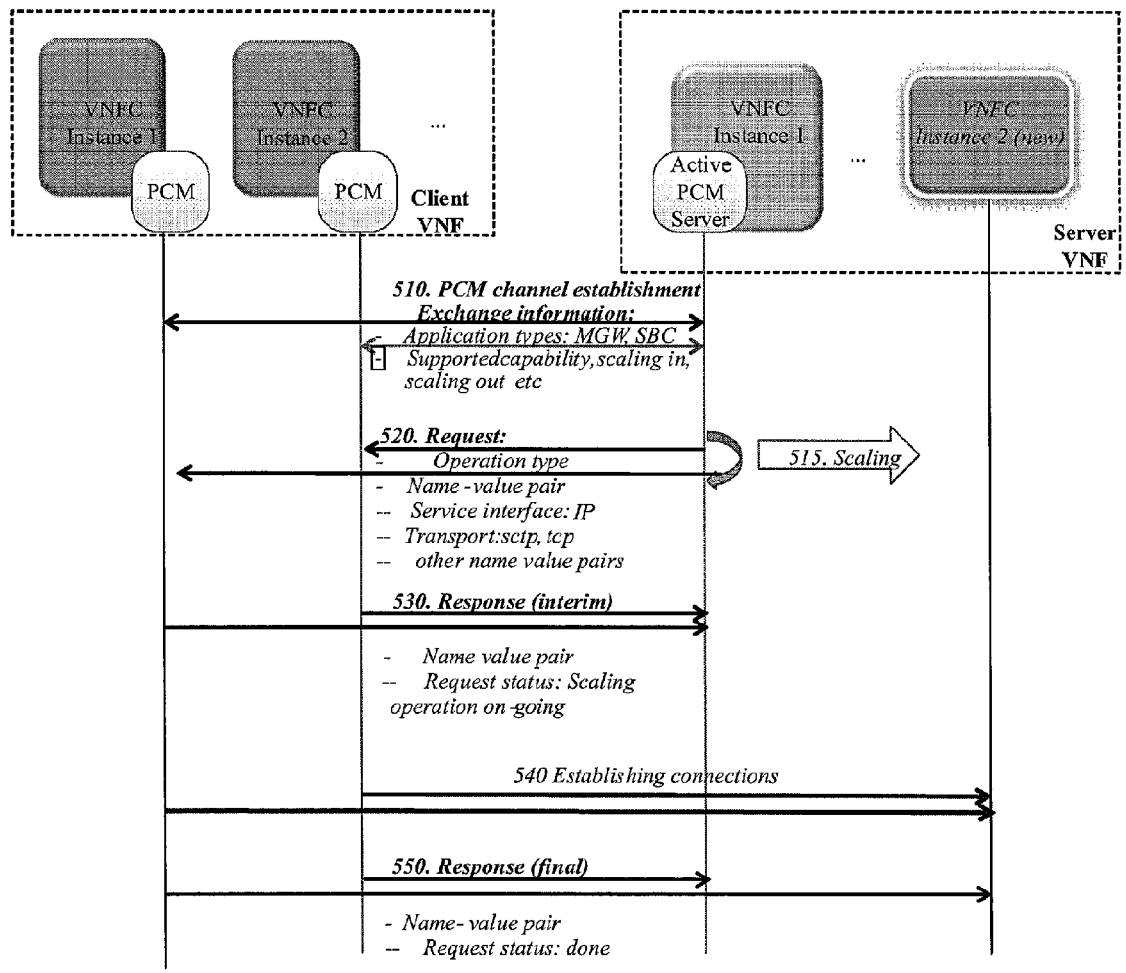
FIG. 5 illustrates an example message flow for implementing scaling of a server VNF in a virtualized network as illustrated in FIG. 3 or 4 according to an embodiment of the present disclosure.

FIG. 5 illustrates an example message flow for scaling of the server VNF in the virtualized network as illustrated in FIG. 3 or 4 according to an embodiment of the present disclosure. Although this message flow is shown in the context of FIG. 3 or 4, it shall be appreciated that the basic principle and concept under this message flow may also be generally applied to other possible application scenarios in any other structures of the virtualized networks according to various embodiments of the present disclosure.

Upon initialization, a PCM channel may be established at step 510 between the PCM clients in the client VNF and the active PCM server in the server VNF. For the sake of simplicity, only one active PCM server is shown. It shall be appreciated that more active PCM servers may be configured. Then, via this PCM channel, the PCM clients in the client VNF may acquire capability information of the server VNF from the PCM server, while the PCM server may acquire capability information of the client VNF from the PCM clients. Of course, the PCM clients in the client VNF may also acquire its own capability information beforehand for transmission to the PCM server while the PCM server may also acquire its own capability information for transmission to the PCM clients in the client VNF. For example, the active PCM server and the PCM clients may exchange some information, like application type, such MGW or SBC, supported capabilities, such as the capability of supporting scaling out and/or supporting scaling in etc.

Then in response that a scaling operation is performed by the VNF manager at step 515, the PCM server may notify the PCM clients in the client VNF of the scaling information by sending a request to them at step 520. The request may include, in the form of Name-Value pairs, at least information on the interface(s) between the added or removed VNFC instance(s) and the PCM clients in the client VNF, e.g. a service interface IP address, and the type of the scaling operation, e.g. scaling out in this figure. The request may also include some other information for facilitating communications between the PCM server and the PCM clients in the client VNF, e.g. the adopted transport protocol, such as Stream Control Transmission Protocol (SCTP) or Transport Control Protocol (TCP).

Then, the active PCM server may receive at step 530 a response to its request, which may be referred to as an interim response, from the PCM clients. The response may include an acknowledgement for confirming successful receipt of the request and may additionally report a request status, such as adaptive operations corresponding to the scaling being in progress, in the form of a name-value pair.

At step 540, the PCM clients may then initiate establishment of a connection(s) with the newly added VNFC instance(s) in the case that the scaling type is scaling out as illustrated. Otherwise, the PCM clients may disconnect the connection(s) from the removed VNFC instance(s) in the case that the scaling type is scaling in.

At last, once the adaptive operations to the scaling has been completed, the PCM clients may send another response, which may be referred to as a final response, to the active PCM server as well as the newly added VNFC instance. The response may report a request status, such as adaptive operations corresponding to the scaling being completed, in the form of a name-value pair.

In this example, the PCM server is deployed together with a PCM client in the server VNF. It shall be appreciated that in other network structures where the PCM server may be deployed outside the server VNF, the message flow as mentioned above may also be applied for implementing scaling of the server VNF.

Figure 6:
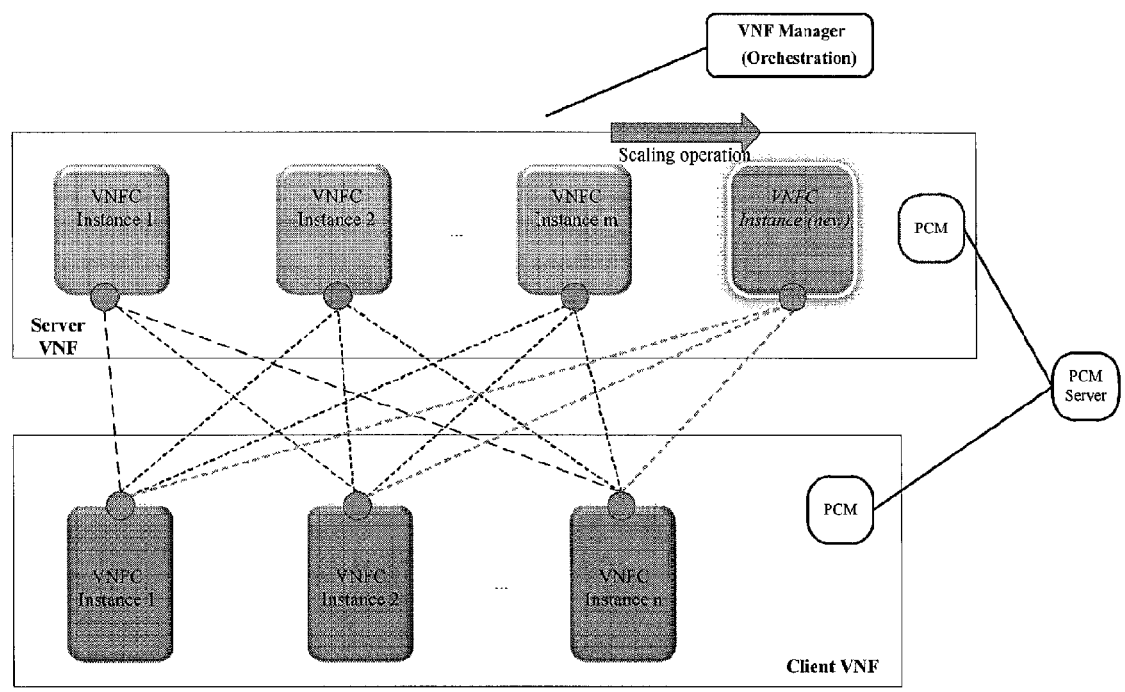
FIG. 6 illustrates an application scenario when scaling out is performed in yet another specific structure of a virtualized network according to an embodiment of the present disclosure.

FIG. 6 illustrates an application scenario when scaling out is performed in another specific structure of a virtualized network according to an embodiment of the present disclosure. In this virtualized network, a PCM server is implemented outside a server VNF, a PCM client is implemented in the server VNF as a separate instance or module, and a PCM client is implemented in a client VNF as a separate instance or module.

In this embodiment, communications between the PCM server and the PCM client in the client VNF may be conducted according to a dedicated protocol different from the existing protocol used for the communications between the server VNF and the client VNF. Alternatively, the communications between the PCM server and the PCM clients may be conducted according to the existing protocol.

A main operation procedure for the scaling out scenario is similar to that described above with reference to FIG. 3.

Particularly, upon a request or trigger for scaling out the server VNF, the VNF manager performs a scaling operation on the server VNF, for example adding one or more VNFC instances. In the embodiment of FIG. 6, one VNFC instance shown with 'new' is added.

Then the PCM client in the server VNF may obtain scaling information of the newly added one or more VNFC instances directly from the VNF manager or obtain the scaling information from the server VNF based on the scaling operation performed by the VNF manager. In this embodiment of FIG. 6, the scaling information may comprise at least information on an interface between the added server VNFC instance and the client VNF and a type of the scaling operation, i.e. the scaling out operation.

Additionally, the PCM client may perform adaptive operations according to the scaling out operation performed by the VNF manager, for example adapting connections between the server VNFC instances and the client VNFC instances according to the interface change resulting from the added one or more VNFC instances.

Afterwards, the PCM server, which is the active PCM server, may receive the scaling information notified by the PCM client in the server VNF. Alternatively, the PCM server may obtain the scaling information directly from the VNF manager. In the latter case, the PCM client in the server VNF may not be necessary for the obtaining of the scaling information.

Preferably, there may be deployed another PCM server that serves as a standby PCM server for taking over the function of the active PCM server when it is not available, e.g. due to a failure or removal.

Subsequently, the active PCM server notifies all connected client VNFC instances in the client VNF of the scaling information.

At the client VNF side, after receiving the scaling information from the active PCM server, all the connected VNFC instances in the client VNF will perform adaptive operations, for example initiating a connection to the newly added VNFC instance in the server VNF. After this, the newly added VNFC instance can be in operation.

With this specific structure, for a scenario when scaling in is performed by the VNF manager, main differences from the illustrated scaling out scenario lie in that: the scaling information conveyed between the active PCM server and the PCM client in the client VNF may comprise at least information on an interface(s) between the removed one or more server VNFC instances and the client VNF and a type of the scaling operation, i.e. the sealing in operation; and when receiving this information by the client VNF, particularly by all the connected VNFC instances in the client VNF, the client VNF may perform adaptive operations, for example disconnecting the connection(s) from the removed one or more VNFC instances before they are actually removed.

In another embodiment, the PCM server may be embodied in a Domain Name System (DNS) server or as at least part of the DNS server.

Alternatively, the PCM server may be embodied at or as at least part of the VNF manager. In this embodiment, the scaling information may be directly obtained from the VNF manager rather than from the PCM client in the server VNF.

Figure 7:
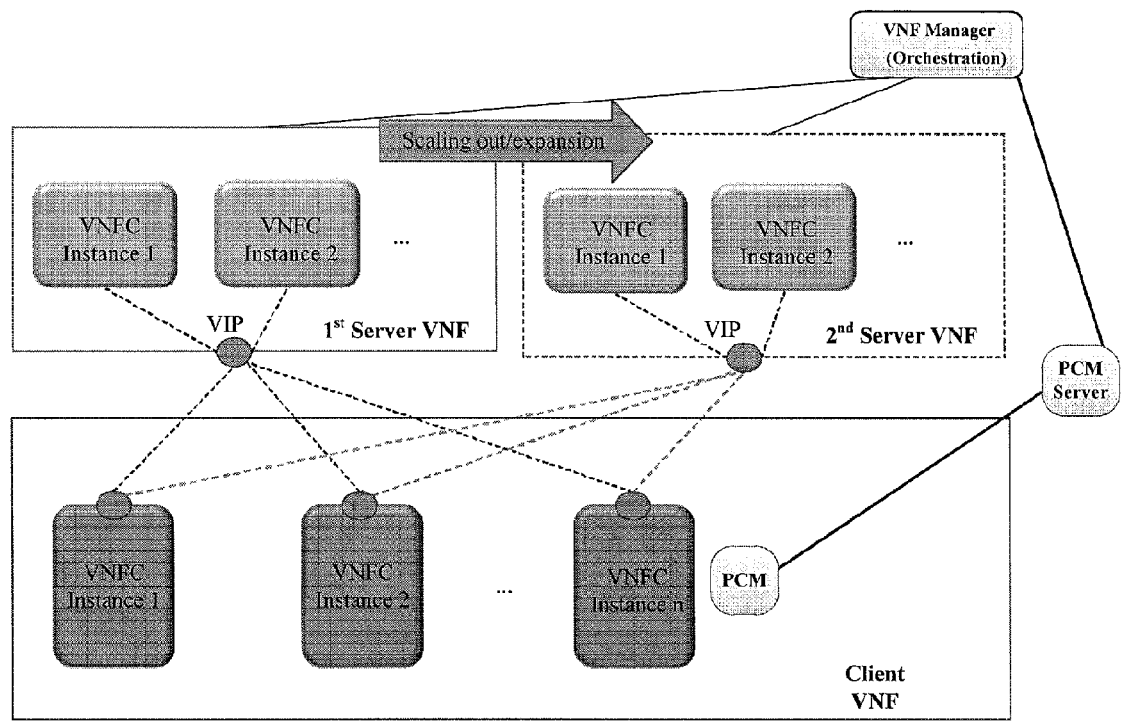
FIG. 7 illustrates an application scenario when scaling out is performed in yet another specific structure of a virtualized network according to an embodiment of the present disclosure.

FIG. 7 illustrates an application scenario when scaling out is performed in another specific structure of a virtualized network according to an embodiment of the present disclosure in which a PCM server is implemented outside server VNFs and a PCM client is implemented in a client VNF as a separate instance or module. In this embodiment, no PCM client needs to be implemented in the server VNF and it shall be appreciated more PCM clients may be implemented on various VNFC instances in the client VNF.

In this embodiment, communications between the PCM server and the PCM client in the client VNF may be conducted according to a dedicated protocol different from the existing protocol used for the communications between the server VNF and the client VNF. Alternatively, the communications between the PCM server and the PCM client may be conducted also according to the existing protocol.

A main operation procedure for the scaling out scenario is described as below.

Particularly, upon a request or trigger for scaling out a first server VNF, the VNF manager performs a scaling operation on the first server VNF, for example adding one or more server VNFs. In the embodiment of FIG. 7, a second server VNF is added.

In this case, no PCM client is deployed in the server VNF, therefore the PCM server may obtain scaling information of the newly added one or more server VNFs from the VNF manager only. In this case, the scaling information may comprise at least information on an interface between the added server VNF(s) and the client VNF and a type of the scaling operation, i.e. the scaling out operation. Each of the server VNFs exhibits only one virtual interface, e.g. VIP, for interfacing with the client VNF.

Preferably, there may be deployed another PCM server that serves as a standby PCM server for taking over the function of the PCM server when it is not available, e.g. due to a failure or removal.

Subsequently, the active PCM server notifies all connected client VNFC instances in the client VNF of the scaling information.

At the client VNF side, after receiving the scaling information from the active PCM server, all the connected VNFC instances in the client VNF will perform adaptive operations, for example initiating a connection to the newly added server VNF, i.e. the second server VNF. After this, the newly added server VNF can be in operation.

With this specific structure, for a scenario when scaling in is performed by the VNF manager, main differences from the illustrated scaling out scenario lie in that: the scaling information conveyed between the active PCM server and the PCM client in the client VNF may comprise at least information on an interface(s) between the removed one or more server VNFs and the client VNF and a type of the scaling operation, i.e. the scaling in operation; and when receiving this information by the client VNF, particularly by all the connected VNFC instances in the client VNF, the client VNF may perform adaptive operations, for example disconnecting the connection(s) from the removed one or more server VNFs before they are actually removed.

Figure 8:
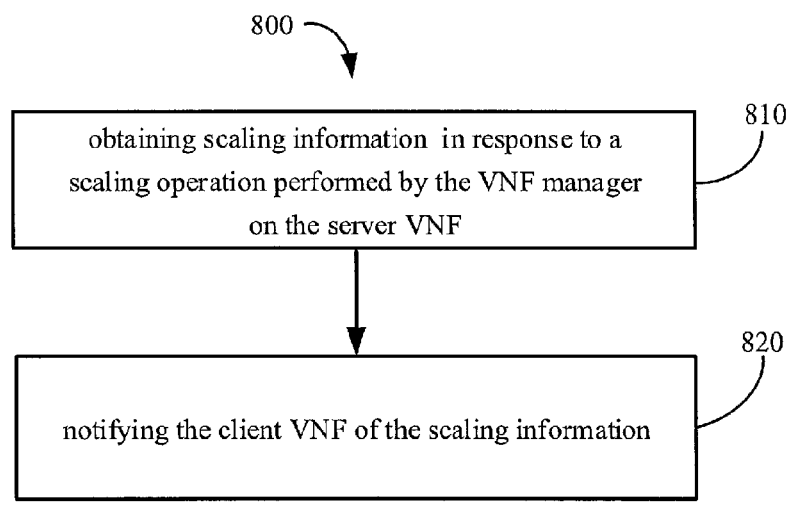
FIG. 8 illustrates a flowchart of a method for scaling of a server VNF in a virtualized network according to various embodiments of the present disclosure.

FIG. 8 illustrates a flowchart of a method 800 for scaling of a server VNF in the virtualized network according to various embodiments of the present disclosure. The virtualized network comprises at least a server VNF, a client VNF connected to the server VNF and a VNF manager. As defined above, the connection between the client VNF and the server VNF is initiated by the client VNF. The method 800 is performed at a PCM server, which is the so-called active PCM server.

As illustrated, the method 800 enters at block 810, in which scaling information is obtained at the PCM server in response to a scaling operation performed by the VNF manager on the server VNF.

As described above with reference to FIG. 2, the server VNF may comprise at least one instance of a server VNF component, VNFC; and the client VNF may also comprise at least one instance of a client VNFC. Thus, the connection between the server VNF and the client VNF may comprise a connection between the at least one instance of the server VNFC and the at least one instance of the client VNFC. More particularly, each of the at least one instance of the client VNFC may be connected to the at least one instance of the server VNFC.

In various embodiments, the PCM server may be implemented at one or more instances of the server VNFC in the server VNF or may be implemented at a VNF separate from the server VNF and the client VNF. In the latter case, the PCM server may be implemented at the VNF manager.

In an embodiment, the scaling information may be obtained directly from the VNF manager.

In another embodiment where the server VNF comprises at least one PCM client that may obtain the scaling information, the scaling information may alternatively be obtained at the PCM server from the at least one PCM client.

Now reference is made back to FIG. 8. At block 820, once the scaling information is obtained, the PCM server notifies the client VNF of the scaling information. In the embodiment that the client VNF comprises at least one PCM client, the PCM server may notify all of the at least one PCM client of the scaling information.

In an embodiment, the scaling operation performed by the VNF manager may comprise either adding an instance of the server VNFC to the server VNF or removing an instance of the server VNFC from the server VNF. In this embodiment, the scaling information may comprise at least interface change information and information on a type of the scaling operation. When the type of the scaling operation is scaling out, i.e. adding an instance of the server VNFC, the interface change information at least comprises information regarding an interface between the added instance of the server VNFC and the at least one instance of the client VNFC in the client VNF. When the type of the scaling operation is scaling in, i.e. removing an instance of the server VNFC, the interface change information at least comprises information regarding an interface between the removed instance of the server VNFC and the at least one instance of the client VNFC in the client VNF.

In another embodiment where the PCM server is implemented at the VNF manager or at a VNF separate from the server VNF and the client VNF, the scaling operation may comprise either adding a server VNF or removing the server VNF. In this embodiment, the scaling information may comprise at least interface change information and information on a type of the scaling information. When the type of the scaling operation is scaling out, i.e. adding a server VNF, then the interface change information at least comprises information regarding an interface between the added server VNF and the client VNF and the type of the scaling operation, i.e. scaling out. When the type of the scaling operation is scaling in, i.e. removing a server VNF, the interface change information at least comprises information regarding an interface between the removed server VNF and the client VNF and the type of the scaling operation, i.e. scaling in.

In a further embodiment, communications between the at least one PCM server and the PCM clients may be conducted according to a dedicated protocol different from a protocol used for communications between the server VNF and the client VNF.

In another embodiment, the virtualized network may further comprise at least one standby PCM server that is capable of taking over the function of the PCM server when the PCM server is not available.

The method 800 according to the various embodiments of the present disclosure provides an automatic and flexible solution to scaling of the server VNF in the virtualized network. According to this method, no manual operations are needed to notify scaling information and configure a client VNF in response to a scaling operation performed on the server VNF, thereby the operational and executive cost may be reduced and failures caused by undesired manual operations may be reduced.

Figure 9:
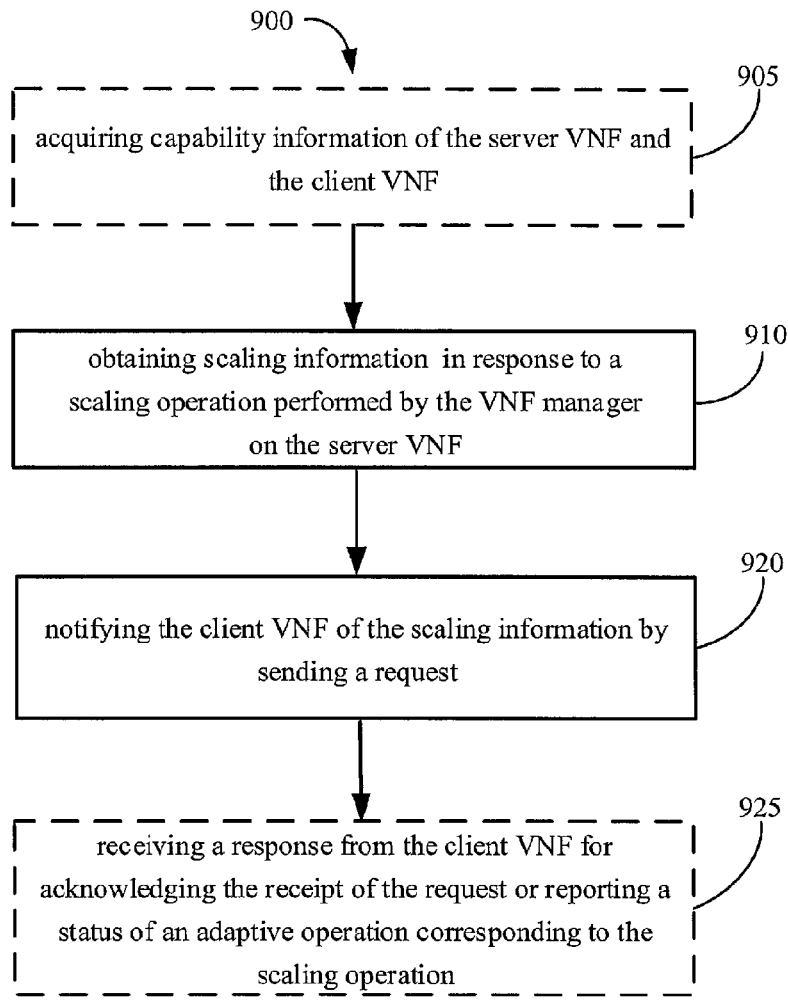
FIG. 9 illustrates a flowchart of a method, which is a specific example of the method in FIG. 8, for scaling of a server VNF in a virtualized network according to another embodiment of the present disclosure.

FIG. 9 illustrates a flowchart of a method 900 for scaling of a server VNF in the virtualized network according to another embodiment of the present disclosure. The method 900 is a detailed embodiment of the method 800 as described above with reference to FIG. 8. The operations in blocks 910 and 920 are the same as those in blocks 810 and 820, which thus will not be repeated herein for the sake of brevity.

The difference between method 900 and method 800 lies in that method 900 further comprises acquiring capability information of the server VNF and the client VNF at block 905 before obtaining scaling information at block 910. In this embodiment, the scaling information may be notified by sending a request to the client VNF.

Then in response that the request is sent to the client VNF, a response may be received from the client VNF for at least acknowledging the receipt of the request at block 925. The response may also comprise a status of an adaptive operation corresponding to the scaling operation, e.g. the adaptive operation being in progress, which may be the interim response in FIG. 5.

Further, another response for reporting a status of an adaptive operation corresponding to the scaling operation (e.g. the adaptive operation being completed) may also be received from the client VNF at block 925, which may be the final response in FIG. 5.

Figure 10:
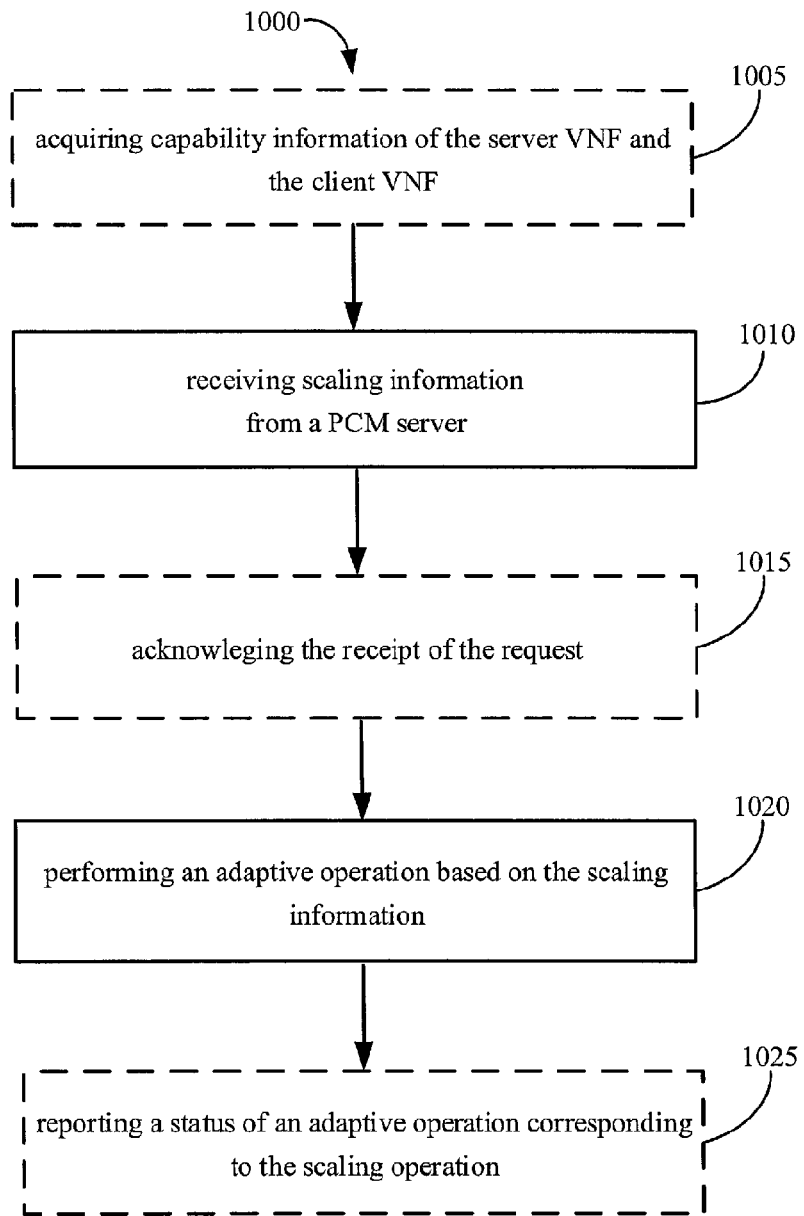
FIG. 10 illustrates a flowchart of a method for scaling of a server VNF in a virtualized network according to embodiments of the present disclosure.

FIG. 10 illustrates a flowchart of a method 1000 for scaling of a server VNF in a virtualized network according to embodiments of the present disclosure. The virtualized network comprises at least the server VNF, a client VNF connected to the server VNF and a VNF manager. As defined above, the connection between the client VNF and the server VNF is initiated by the client VNF. The method 1000 is performed at the client VNF.

In FIG. 10, blocks with a solid line represent essential operations while blocks with a broken line represent optional operations. The description of the method 1000 will start from the essential operations.

As illustrated, the method 1000 enters at block 1010, in which scaling information is received from a PCM server in response to a scaling operation performed by the VNF manager on the server VNF. In an embodiment, the scaling information may be received from the PCM server in a request.

Then at block 1020, the client VNF performs an adaptive operation based on the scaling information.

In an embodiment, the server VNF may comprise at least one instance of a server VNFC. The client VNF may comprise at least one instance of a client VNFC. The at least one instance of the server VNFC in the server VNF are connected by the at least one instance of the client VNFC.

In the embodiment that the scaling information is received from the PCM server in the request, the method may further comprise acquiring capability information of the server VNF and the client VNF at block 1005. Then, at block 1015, the client VNF at least acknowledges the receipt of the request in a response to the request and/or reports, at block 1025, a status of an adaptive operation corresponding to the scaling operation in another response to the request.

Preferably, communications of the capability information, the scaling information and the response between the client VNF and the PCM server may be conducted according to a dedicated protocol different from a protocol used for communications between the server VNF and the client VNF.

Figure 11:
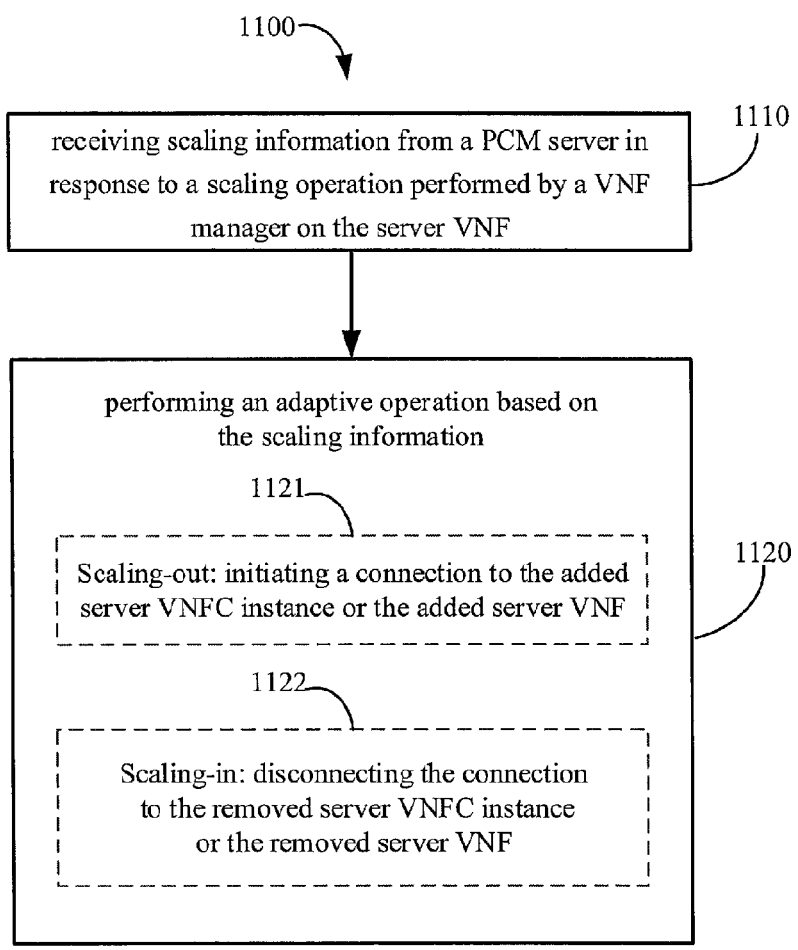
FIG. 11 illustrates a flowchart of a method, which is a specific example of the method in FIG. 10, for scaling of a server VNF in a virtualized network according to another embodiment of the present disclosure.

FIG. 11 illustrates a flowchart of a method 1100, which is a specific example of the method 1000 for scaling of a server VNF in a virtualized network according to an embodiment of the present disclosure. The operation of block 1110 in the method 1100 is the same as that of block 1010 in the method 1000. The block 1120 of the method 1100 more particularly details the operation of block 1020 of FIG. 10.

In the case that the scaling operation is the scaling out operation, e.g. adding an instance of the server VNFC to the server VNF, the operation of performing the adaptive operation at block 1120 may comprise initiating a connection to the added instance of the server VNFC at block 1121.

In the case that the scaling operation is the scaling in operation, e.g. removing an instance of the server VNFC from the server VNF, the operation of performing the adaptive operation at block 1120 may comprise disconnecting the connection from the removed instance of the server VNFC at block 1122.

In the case that the scaling operation is the scaling out operation, e.g. adding a server VNF, the operation of performing the adaptive operation at block 1120 may comprise initiating a connection to the added server VNF at block 1121.

In the case that the scaling operation is the scaling in operation, e.g. removing the server VNF, the operation of performing the adaptive operation at block 1120 may comprise disconnecting the connection from the removed server VNF at block 1122.

According to the method 1000 or 1100, the client VNF can be configured based on scaling information which is automatically notified by the PCM server, thereby the operational and executive cost may be reduced and failures caused by undesired manual operations may be reduced since no manual operation is involved.

Figure 12:
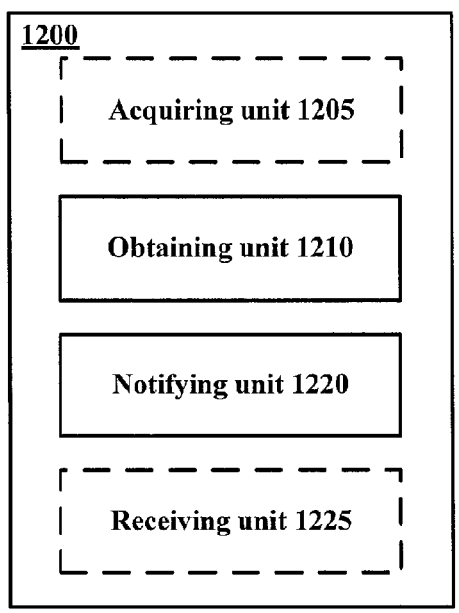
FIG. 12 illustrates a schematic block diagram of an apparatus for scaling of a server VNF in a virtualized network according to embodiments of the present disclosure.

FIG. 12 illustrates a schematic block diagram of an apparatus 1200 for scaling of a server VNF in a virtualized network according to embodiments of the present disclosure. The virtualized network comprises at least the server VNF, a client VNF connected to the server VNF and a VNF manager. As defined above, the connection between the client VNF and the server VNF is initiated by the client VNF. The apparatus 1200 may be embodied in the server VNF or at a VNF separate from the server VNF and the client VNF, wherein the separate VNF may be the VNF manager.

Particularly, the apparatus 1200 may comprise an obtaining unit 1210 and a notifying unit 1220. The obtaining unit 1210 is configured to obtain, at a PCM server, scaling information in response to a scaling operation performed by the VNF manager on the server VNF. The notifying unit 1220 is configured to notify the client VNF of the scaling information.

In an embodiment, the server VNF may comprise at least one instance of a server VNFC. The client VNF may comprise at least one instance of a client VNFC. The at least one instance of the server VNFC is connected by the at least one instance of the client VNFC.

In a further embodiment, the PCM server may be implemented at one or more instances of the server VNFC in the server VNF.

In another embodiment, the scaling operation may comprise either adding an instance of the server VNFC to the server VNF or removing an instance of the server VNFC from the server VNF. Correspondingly, the scaling information may comprise at least information regarding an interface between the added or removed instance of the server VNFC and the at least one instance of the client VNFC in the client VNF and a type of the scaling operation.

In yet another embodiment, the scaling operation may comprise either adding a server VNF or removing the server VNF. Correspondingly, the scaling information may comprise at least information regarding an interface between the added or removed server VNF and the client VNF and a type of the scaling operation.

In yet another embodiment, the server VNF may comprise at least one PCM client capable of obtaining the scaling information. In this embodiment, the obtaining unit 1210 may be configured to obtain the scaling information from the at least one PCM client or from the VNF manager.

In yet another embodiment, the apparatus may further comprise an acquiring unit 1205 and a receiving unit 1225. The acquiring unit 1205 may be configured to acquire capability information of the server VNF and the client VNF. In this embodiment, the notifying unit 1210 may be configured to notify the scaling information by sending a request to the client VNF. The receiving unit 1225 may be configured to receive a response from the client VNF for at least acknowledging the receipt of the request and/or to receive another response for reporting a status of an adaptive operation corresponding to the scaling operation.

In yet another embodiment, the client VNF may comprise at least one PCM client that receives the scaling information from the PCM server. In this embodiment, the notifying unit 1220 may be configured to notify the at least one PCM client of the scaling information.

In yet another embodiment, communications between the at least one PCM client and the PCM server may be conducted according to a dedicated protocol different from a protocol used for communications between the server VNF and the client VNF.

In yet another embodiment, the virtualized network may further comprise at least one standby PCM server that is capable of taking over the function of the PCM server when the PCM server is not available.

The above units 1205, 1210, 1220 and 1225 may be configured to implement the corresponding operations as described in relation to methods 800 and 900. All features of the specific structures of the virtualized network as described above with reference to FIGS. 2-7 are equally applicable to the apparatus 1200 and thus will not be detailed herein for the sake of brevity.

Figure 13:
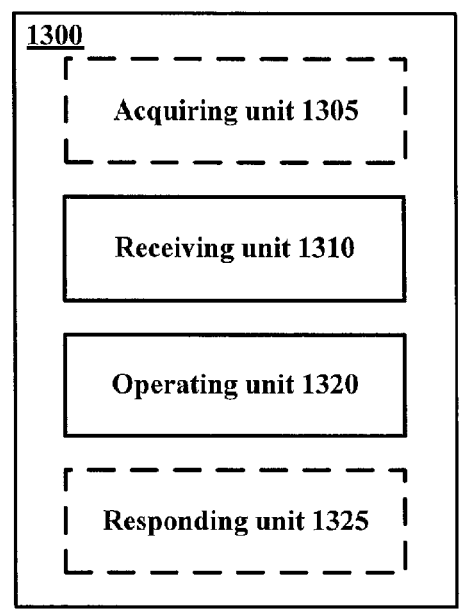
FIG. 13 illustrates a schematic block diagram of another apparatus for scaling of a server VNF in a virtualized network according to embodiments of the present disclosure.

FIG. 13 illustrates a schematic block diagram of an apparatus 1300 for scaling of a server VNF in a virtualized network according to embodiments of the present disclosure. The virtualized network comprises at least the server VNF, a client VNF connected to the server VNF and a VNF manager. The connection between the server VNF and the client VNF is initiated by the client VNF.

Particularly, the apparatus comprises a receiving unit 1310 and an operating unit 1320. The receiving unit 1310 is configured to receive, at the client VNF, scaling information from a peer connection management PCM server in response to a scaling operation performed by the VNF manager on the server VNF. The operating unit 1320 is configured to perform, at the client VNF, an adaptive operation based on the scaling information.

In an embodiment, the server VNF may comprise at least one instance of a server VNFC. The client VNF may comprise at least one instance of a client VNFC. In this embodiment, the at least one instance of the server VNFC may be connected by the at least one instance of the client VNFC.

In a further embodiment, the scaling operation may comprise either adding an instance of the server VNFC to the server VNF or removing an instance of the server VNFC from the server VNF. If the scaling operation is adding an instance of the server VNFC, the operating unit 1320 may be further configured to initiate a connection to the added instance of the server VNFC. If the scaling operation is removing an instance of the server VNFC, the operating unit 1320 may be further configured to disconnect the connection from the removed instance of the server VNFC.

In another embodiment, the scaling operation may comprise either adding a server VNF or removing the server VNF. If the scaling operation is adding a server VNF, the operating unit 1320 may be further configured to initiate a connection to the added server VNF. If the scaling operation is removing the server VNF, the operating unit 1320 may be configured to disconnect the connection from the removed server VNF.

In yet another embodiment, the apparatus 1300 may further comprise an acquiring unit 1305 and a responding unit 1325. The acquiring unit 1305 may be configured to acquire capability information of the server VNF and the client VNF. The receiving unit 1310 may further be configured to receive the scaling information in a request from the PCM server. The responding unit 1325 may be configured to at least acknowledge the receipt of the request in a response to the request and/or to report a status of an adaptive operation corresponding to the scaling operation in a response to the request.

In yet another embodiment, communications of the capability information, the scaling information and the response between the client VNF and the PCM server may be conducted according to a dedicated protocol different from a protocol used for communications between the server VNF and the client VNF.

The above units 1305, 1310, 1320 and 1325 may be configured to implement the corresponding operations or steps as described in relation to methods 1000 and 1100. All features of the specific network structures described above with reference to FIGS. 2-7 are equally applicable to the apparatus 1300 and thus will not be detailed herein for the sake of brevity.

Figure 14:
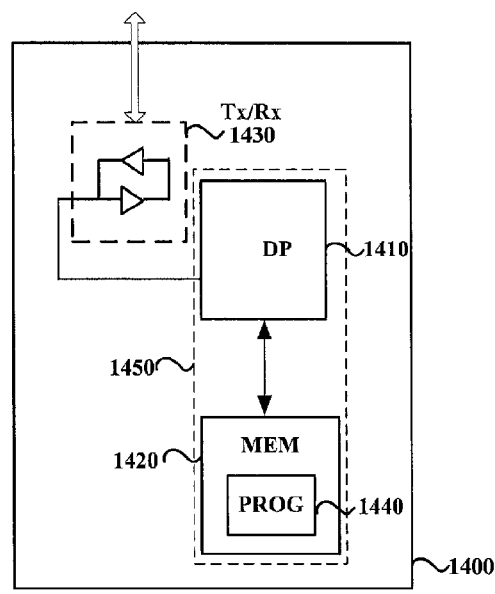
FIG. 14 illustrates a schematic block diagram of yet another apparatus for scaling of a server VNF in a virtualized network according to embodiments of the present disclosure.

FIG. 14 illustrates a schematic block diagram of an apparatus 1400 for scaling of a server VNF in a virtualized network according to embodiments of the present disclosure. The virtualized network comprises at least the server VNF, a client VNF connected to the server VNF and a VNF manager. As defined above, the connection between the client VNF and the server VNF is initiated by the client VNF.

The apparatus 1400 comprises at least one processor 1410, such as a data processor (DP) and at least one memory (MEM) 1420 coupled to the processor 1410. The apparatus 1400 may further comprise a transmitter TX and receiver RX 1430 coupled to the processor 1410 for establishing communications with other apparatuses. The MEM 1420 stores a program (PROG) 1440. A combination of the at least one processor 1410 and the at least one MEM 1420 may form processing means 1450 adapted to implement some embodiments of the present disclosure.

Particularly, the apparatus 1400 may be embodied at a PCM server. In this case, the PROG 1440 may include instructions that, when executed on the associated processor 1410, enable the apparatus 1400 to operate in accordance with the embodiments of the present disclosure, for example to perform the method 800 or 900 as described with reference to FIGS. 8 and 9. Alternatively, the processing means 1450 may be adapted to implement some embodiments of the present disclosure as described with reference to FIGS. 8 and 9.

The apparatus 1400 may alternatively be embodied at the client VNF. In this case, the PROG 1440 may include instructions that, when executed on the associated processor 1410, enable the apparatus 1400 to operate in accordance with the embodiments of the present disclosure, for example to perform the method 1000 or 1100 as described with reference to FIGS. 10 and 11. Alternatively, the processing means 1450 may be adapted to implement some embodiments of the present disclosure as described with reference to FIGS. 10 and 11.

The MEM 1420 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1410 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for scaling of a server virtualized network function (VNF) in a virtualized network; the virtualized network comprising at least the server VNF, a client VNF connected to the server VNF, and a VNF manager; the method comprising:
   acquiring, by a peer connection management (PCM) server, capability information of the server VNF and the client VNF;
   obtaining, at the PCM server, scaling information in response to a scaling operation performed by the VNF manager on the server VNF;
   notifying, by the PCM server, the client VNF of the scaling information by sending a request to the client VNF; and
   receiving, by the PCM server:
      a first response from the client VNF that at least acknowledges the receipt of the request; and/or
      a second response reporting a status of an adaptive operation corresponding to the scaling operation;
   wherein the connection between the client VNF and the server VNF is initiated by the client VNF.

2. The method of claim 1:
   wherein the server VNF comprises at least one instance of a server VNF component (VNFC);
   wherein the client VNF comprises at least one instance of a client VNFC; and
   wherein the connection between the server VNF and the client VNF comprises a connection between the at least one instance of the server VNFC and the at least one instance of the client VNFC.

3. The method of claim 2:
   wherein the scaling operation comprises either adding an instance of the server VNFC to the server VNF or removing an instance of the server VNFC from the server VNF; and
   wherein the scaling information comprises at least information on an interface between the added or removed instance of the server VNFC and the at least one instance of the client VNFC in the client VNF and a type of the scaling operation.

4. The method of claim 2, wherein the PCM server is implemented at one or more instances of the server VNFC in the server VNF.

5. The method of claim 1:
   wherein the server VNF comprises at least one PCM client capable of obtaining the scaling information; and
   wherein the scaling information is obtained at the PCM server from the at least one PCM client or from the VNF manager.

6. A method for scaling of a server virtualized network function (VNF) in a virtualized network; the virtualized network comprising at least the server VNF, a client VNF connected to the server VNF, and a VNF manager; the method comprising:
   acquiring capability information of the server VNF and the client VNF;
   receiving, at the client VNF, scaling information in a request from a peer connection management (PCM) server in response to a scaling operation performed by the VNF manager on the server VNF;
   performing, at the client VNF, an adaptive operation based on the scaling information;
   in response to the request, acknowledging the receipt of the request and/or reporting a status of the adaptive operation corresponding to the scaling operation;
   wherein the connection between the client VNF and the server VNF is initiated by the client VNF.

7. The method of claim 6:
   wherein the server VNF comprises at least one instance of a server VNF component (VNFC);
   wherein the client VNF comprises at least one instance of a client VNFC; and
   wherein the connection between the server VNF and the client VNF comprises a connection between the at least one instance of the server VNFC and the at least one instance of the client VNFC.

8. The method of claim 6:
   wherein the scaling operation comprises either adding a server VNF or removing the server VNF; and
   further comprising performing, at the client VNF, the adaptive operation comprising:
      initiating a connection to the added server VNF if the scaling operation is the adding a server VNF; or
      disconnecting the connection from the removed server VNF if the scaling operation is the removing the server VNF.

9. An apparatus for scaling of a server virtualized network function (VNF) in a virtualized network; the virtualized network comprising at least the server VNF, a client VNF connected to the server VNF, and a VNF manager; the apparatus comprising:
   processing circuitry;
   memory containing instructions executable by the processing circuitry whereby the apparatus is operative to:
      acquire, by a peer connection management (PCM) server, capability information of the server VNF and the client VNF;
      obtain, at the PCM server, scaling information in response to a scaling operation performed by the VNF manager on the server VNF; and
      notify the client VNF of the scaling information by sending a request to the client VNF;
      receive, by the PCM server:
         a first response from the client VNF that at least acknowledges the receipt of the request; and/or
         a second response reporting a status of an adaptive operation corresponding to the scaling operation;
   wherein the connection between the client VNF and the server VNF is initiated by the client VNF.

10. The apparatus of claim 9:
    wherein the server VNF comprises at least one instance of a server VNF component (VNFC); and
    wherein the client VNF comprises at least one instance of a client VNFC; and
    wherein the connection between the server VNF and the client VNF comprises a connection between the at least one instance of the server VNFC and the at least one instance of the client VNFC.

11. The apparatus of claim 9, wherein the PCM server is implemented at one or more instances of the server VNFC in the server VNF.

12. The apparatus of claim 9:
    wherein the server VNF comprises at least one PCM client capable of obtaining the scaling information; and
    wherein the obtaining unit is configured to obtain the scaling information from the at least one PCM client or from the VNF manager.

13. The apparatus of claim 9:
    wherein the client VNF comprises at least one PCM client that receives the scaling information from the PCM server; and wherein the instructions are such that the apparatus is operative to notify the at least one PCM client of the scaling information.

14. A apparatus for scaling of a server virtualized network function (VNF) in a virtualized network; the virtualized network comprising at least the server VNF, a client VNF connected to the server VNF, and a VNF manager; the apparatus comprising:

processing circuitry;

memory containing instructions executable by the processing circuitry whereby the apparatus is operative to:

acquire capability information of the server VNF and the client VNF;

receive, at the client VNF, scaling information in a request from a peer connection management PCM server in response to a scaling operation performed by the VNF manager on the server VNF;

perform, at the client VNF, an adaptive operation based on the scaling information;

in response to the request, acknowledge the receipt of the request and/or report a status of the adaptive operation corresponding to the scaling operation;

wherein the connection between the client VNF and the server VNF is initiated by the client VNF.

15. The apparatus of claim 14:

wherein the server VNF comprises at least one instance of a server VNF component (VNFC);

wherein the client VNF comprises at least one instance of a client VNFC; and wherein the connection between the server VNF and the client VNF comprises a connection between the at least one instance of the server VNFC and the at least one instance of the client VNFC.

16. The apparatus of claim 14:

wherein the scaling operation comprises either adding a server VNF or removing the server VNF; and wherein the instructions are such that the apparatus is operative to:

initiate a connection to the added server VNF if the scaling operation is the adding a server VNF; or disconnect the connection from the removed server VNF if the scaling operation is the removing the server VNF.

* * * * *